Oct. 8, 1935.        N. L. MADDOX        2,016,645
SCREENING DEVICE FOR AUTOMOBILES
Original Filed Nov. 13, 1933    2 Sheets-Sheet 1

INVENTOR
*Nona Lea Maddox*
BY
ATTORNEY

Oct. 8, 1935.   N. L. MADDOX   2,016,645

SCREENING DEVICE FOR AUTOMOBILES

Original Filed Nov. 13, 1933   2 Sheets-Sheet 2

INVENTOR
Nona Lea Maddox
BY
ATTORNEY

Patented Oct. 8, 1935

2,016,645

UNITED STATES PATENT OFFICE 2,016,645

SCREENING DEVICE FOR AUTOMOBILES

Nona Lea Maddox, Fresno, Calif.

Application November 13, 1933, Serial No. 697,773
Renewed March 6, 1935

4 Claims. (Cl. 156—14)

This invention relates to automobiles and particularly to what are known as closed cars. In such cars considerable annoyance is had when the windows are open by reason of insects which fly or are blown into the car through the windows. Also, dogs traveling with the other occupants of the car sometimes jump out of an open window when the vehicle is in motion and such open windows are also a source of danger to small children. At the same time some opening must obviously be provided when traveling in hot weather to give the necessary ventilation.

The principal object of my invention is to eliminate the annoyance and danger of the ordinary form of open window by providing screen panes, mounted alongside the glass panes, and likewise movable selectively to cover the window or to be placed out of the way when their use is not necessary, as when the windows are to be kept closed. In this manner the desired ventilation is retained while the occupants of the car are safeguarded and free from the annoyance of insects. Also the car may be left parked with the screens raised so that the interior will remain ventilated while the contents are protected from theft.

Also in the case of pets or small children left in the car they are free from the discomfort due to any lack of ventilation while at the same time they are kept from harm due to possibly jumping or falling through the windows.

A further object of the invention is to provide for the operation of either the glass or screen pane selectively, by a single operating handle so constructed that the operation is very easily effected.

I have also provided a screen device for the windshield of the car which prevents the entrance of the insects into the same even when the windshield is open as is sometimes desired in hot weather.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
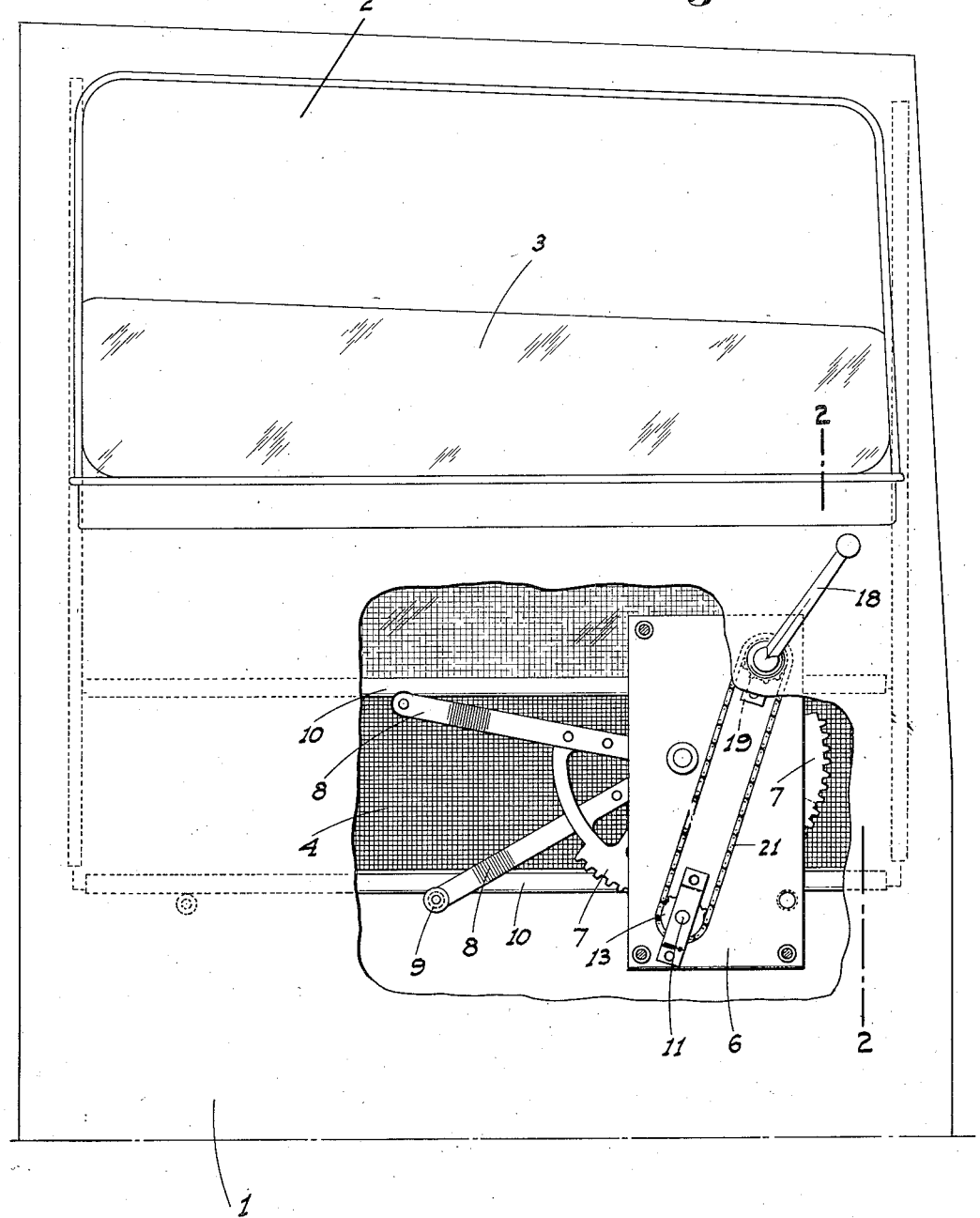
Figure 1 is an inside view partly broken out of an automobile door showing the same equipped with the glass and screen panes.
Figure 2:
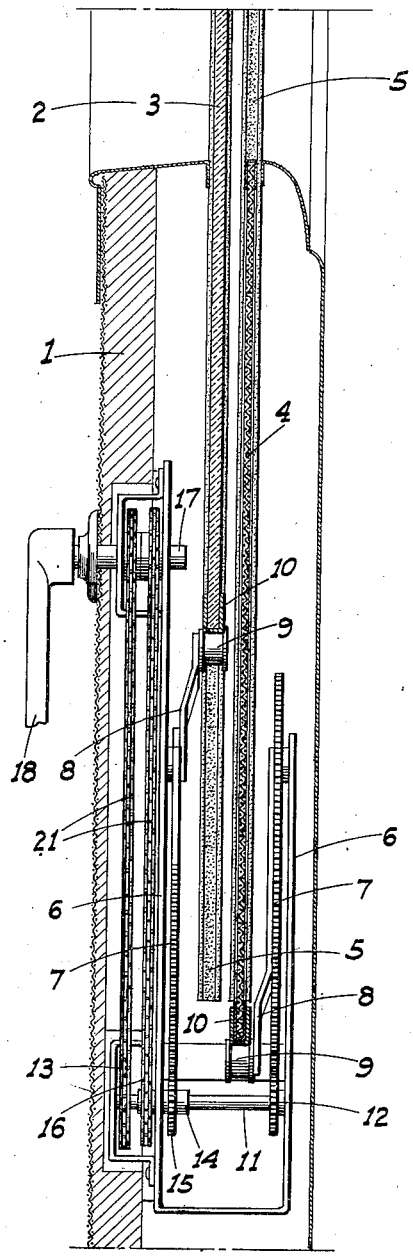
Figure 2 is a transverse section on the line 2—2 of Figure 1.

Referring now more particularly to the characters of reference on the drawings, the door 1 of the automobile is of the usual hollow construction provided with a window opening 2. Relatively inner and outer glass and screen panes 3 and 4 respectively of a size to cover the opening are mounted in the door for lowering movement into the hollow area below the opening and are guided on their side edges by felt lined panels 5 in the customary manner.

Secured in the door is a vertical U shaped frame 6, the panes being disposed and movable between the opposed walls of said frame and the bottom of the latter being below the lowest position of the panes. Pivoted on the inner faces of the vertical walls of the frame 6, between such walls and the adjacent panes, are segmental gears 7 having radial arms 8 rigid therewith. The outer ends of the arms carry rollers 9 which ride on the lower edges of the bottom rails 10 of the respective panes. This arrangement, as will be evident, is practically standard except that the gears face down instead of up as usual.

Pivoted in the frame 6 below the lowest position of the panes is a transverse shaft 11 carrying adjacent one end a pinion 12 engaging the outer gear 7. On its opposite end, beyond the inner wall of the frame 6, said shaft carries a sprocket wheel 13. Turnably mounted on the shaft 11 is a sleeve 14 carrying a pinion 15 which engages the inner gear 7. This sleeve, between the sprocket wheel 13 and the adjacent wall of the frame 6 carries a similar sprocket wheel 16.

Journaled for turning and sliding movement in the inner wall of the frame 6 near the top, or in a position corresponding to that occupied by the usual operating handle shaft, is a shaft 17 having an operating crank 18 of standard character on its end inwardly of the door. Separately turnable on said shaft between the door lining and the adjacent wall of the frame 6 are sprocket wheels 19, held against axial movement between said frame 6 and a cage 20 secured to said frame. These sprocket wheels are alined with the lower sprockets 15 and 16 and are connected thereto by endless chains 21. The hubs of the sprockets 19 are in contact with each other and have enlarged bores 22 on the adjacent ends so that a radial pin 24 projecting from the shaft 17 may turn freely therein. Radial recesses 23 in the sprocket wheel hubs at the back of the bores 22 are provided to receive the pin in driving relation.

In operation, to manipulate the glass pane for instance, it is only necessary to push in on the crank 18, turning the same if necessary until the pin 24 is alined with the recess 23 of the corresponding sprocket wheel 19. A rotation of the crank handle will then either raise or lower said pane, according to the direction in which said handle is rotated. When it is desired to operate the other pane, the pane just operated may be left where it is if desired, since it is only necessary to pull out on the crank handle 18 so as to cause the pin 24 to engage the recess 23 in the sprocket wheel of said other pane.

Figure 3:
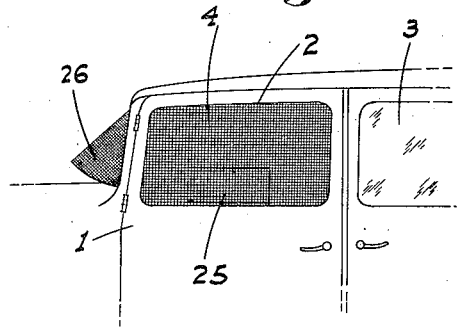
Figure 3 is a fragmentary side outline of an automobile equipped with the window and windshield screens.
Figure 4:
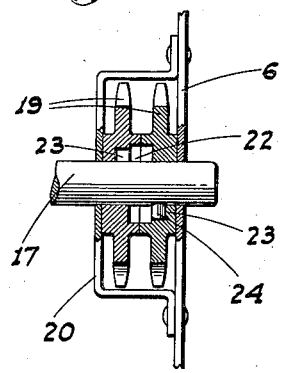
Figure 4 is an enlarged cross section of the selective clutch-sprocket unit.
Figure 5:
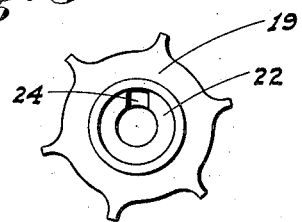
Figure 5 is an end view of one of the sprockets.

The screen panel for the driver's window may be formed if desired with a spring flap portion 25 as shown in Figure 3 so that the driver's hand may be projected therethrough to give a signal without lowering the screen. Though I have shown this flap as being hinged in effect, it may be made to slide lengthwise or up and down, or be otherwise mounted as may be found most suitable.

A protecting screen cage 26 may also be mounted about the lower and side edges of the windshield of the car, as shown in Figure 3. This will allow the windshield, if of the usual forwardly opening type, to be opened any desired amount without insects entering the car through the gap thus formed between the windshield and its caging. This screen would also be as of large mesh as practicable so as to offer a minimum interference with lateral vision.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a window opening having a transparent pane movable to close said opening, a screen pane movable to cover the opening, separate mechanisms for thus moving said panes, said mechanisms including separate pinions, a shaft turnable and slidable through said pinions, an operating handle attached to said shaft, and means between the shaft and pinions to place them in selective and alternate driving engagement with the pinions when the shaft is moved axially.

2. In a window opening having a transparent pane movable to close said opening, a screen pane, movable to cover the opening, separate mechanisms for thus moving said panes, such mechanisms including segmental gears disposed to the sides of the panes, pinions engaging the gears, a single operating handle, and means between the handle and pinions to selectively rotate the pinions with the movement of the handle.

3. In a window opening having a transparent pane movable to close said opening, a screen pane movable to cover the opening, separate mechanisms for thus moving said panes, such mechanisms including segmental gears disposed to the sides of the panes, pinions engaging the gears, a single rotatable operating shaft spaced from the pinions, separate drive devices between said pinions and the shaft, said devices including elements turnable on the shaft, and means to place the shaft in driving engagement with said elements selectively.

4. In a window opening having a transparent pane movable to close said opening, a screen pane movable to cover the opening, separate mechanisms for thus moving said panes, such mechanisms including segmental gears disposed to the sides of the panes, pinions engaging the gears, a single rotatable operating shaft spaced from the pinions, separate drive devices between said pinions and the shaft, said devices including elements turnable on the shaft and through which the latter is slidable, and a pin projecting radially from the shaft between the elements, the latter having sockets in their adjacent faces to selectively receive the pin in driving relation.

NONA LEA MADDOX.